United States Patent [19]

Atkins et al.

[11] 3,818,234
[45] June 18, 1974

[54] RADIATION ABSORBING SHIELD FOR PERSONNEL AND MATERIALS AND METHOD OF MAKING SAME

[75] Inventors: Bobby L. Atkins; Robert N. Bashaw, both of Lake Jackson, Tex.

[73] Assignee: The Dow Chemical Company, Midland, Mich.

[22] Filed: Oct. 16, 1972

[21] Appl. No.: 297,774

Related U.S. Application Data

[63] Continuation-in-part of Ser. No. 214,394, Dec. 30, 1971.

[52] U.S. Cl. .............................. 250/515, 250/518
[51] Int. Cl. ............................................. G21f 1/00
[58] Field of Search ......... 250/108 R, 108 WS, 515, 250/518; 252/478

[56] References Cited
UNITED STATES PATENTS
3,142,649  7/1964  Blanco .......................... 250/108 WS Primary Examiner—James W. Lawrence
Assistant Examiner—Davis L. Willis
Attorney, Agent, or Firm—A. C. Ancona

[57] ABSTRACT

A radiation absorbing shield is constructed by providing within confining walls a continuous or particulate gelled aqueous solution containing suitable soluble and/or insoluble radiation absorbing metal salts, or metal particles, said insoluble salts or metal particles being uniformly dispersed throughout the gelled solution. Monomers, e.g., acrylamide, can be polymerized in the aqueous solution containing the radiation absorbing material, in situ, or they can be polymerized, dried and pulverized and mixed with the aqueous solution to form a particulate mass of gel utilizable as a shield against radiation.

8 Claims, No Drawings

RADIATION ABSORBING SHIELD FOR PERSONNEL AND MATERIALS AND METHOD OF MAKING SAME

CROSS-REFERENCE TO RELATED APPLICATION

The present application is a continuation-in-part of our previous application Ser. No. 214,394 filed Dec. 30, 1971.

BACKGROUND OF THE INVENTION

In working with radioactive material it is necessary to shield personnel and certain susceptible materials from the harmful effects of radiation. In the case of radioactive materials which emit neutrons it has been the practice to use hydrocarbon polymers and compounds, e.g., polyethylene, oils, and the like, which have a high absorbency for the neutrons. In many situations the hydrocarbons are undesirable because of the necessity of maintaining fire resistance in the facility since heat is evolved along with radiation emissions.

It is known also in the art of forming radiation shields that particulate absorptive materials may be included as fillers in a synthetic thermosetting polymer. Thus, insoluble particles of heavy metals or their ores or compounds, such as lead, iron, bismuth, tin, antimony, tungsten and boron, and their oxides can be dispersed in a synthetic resin such as a curable polyester resin, a wax, an epoxy resin, or polyethylene. Examples of these and other similar radiation shields and methods of making them are disclosed in U.S. Pat. Nos. 3,563,920; 3,437,602; 3,200,085; 3,161,606; 3,142,649; 3,114,721 and 3,075,925.

It has been the practice to use large volumes of water within confining walls, frequently in walls of glass or transparent plastic materials, since water is an inexpensive as well as efficient neutron absorber and has the added ability to absorb heat and is also resistant to fire. One disadvantage is that the weight and consequent pressure of such large volumes of water makes the sealing of joints at the corners and edges of the walls difficult. Leaking is common, particularly after exposure of sealing materials which degrade under the influence of radiation. Another disadvantage associated with the leaking water is that, for example, if plutonium is the material being shielded, water will react violently with it to cause fires if they should contact one another.

Thus, it would be highly desirable to prevent the water from leaking by immobilizing it. A known way to immobilize water is to gel it with a gelling agent. One of the requirements is that the gelling agent be able to gel aqueous solutions which contain appreciable concentrations, e.g., 10–70 percent, of metal salts which augment the absorptive ability of water itself. This limits the selection of a gelling agent since all gelling agents do not gel salt solutions and some are quite sensitive to even low concentrations of ions. Crosslinked polyvinyl pyrrolidone and crosslinked polyacrylamide and their copolymers are gelling agents which can be used.

These polymer gels can be prepared either by an in situ polymerization in which the polymer is formed as a continuous gel in place within the confining walls of the shield, or the polymers can be made, dried and pulverized and thereafter used to gel an aqueous solution to be used as a shield.

In the latter case the particles of polymer when swollen with the aqueous fluid remain separate, particulate entities and are mobile to the extent that they can be pumped as a liquid or, in the manner of particulate solids, e.g., sand or flour, they can be flowed by gravity.

DESCRIPTION OF THE INVENTION

It has now been discovered that the aqueous solutions can be immobilized by gelling them in situ. Thus, we have discovered, in preparing a wall segment containing a hollow section filled with water as the principal radiation absorber, the improvement which consists essentially of mixing (1) an aqueous solution of the polymerizable, water-soluble vinyl monomer containing an activator, e.g., an iron salt, and a crosslinker, e.g., a water soluble divinyl monomer with (2) an aqueous solution of a free radical producing catalyst, e.g., a redox catalyst system. The polymerization thus initiated produces a firm body of gel which is stable for long periods of time under the influence of radiation.

An alternate method of producing the gel is to irradiate the solution of polymerizable vinyl monomer in which case the radiation provides the free-radical initiation of the polymerization and subsequently the crosslinking of the polymer. Optionally, the divinyl crosslinking agent may be used in conjunction with a lesser amount of radiation, in which case the radiation acts only as the initiator of the polymerization.

While it is preferred to use a continuous gel, i.e., one formed in the manner described in the preceding paragraphs, a particulate gel is useful, especially if employed in conjunction with insoluble particulate radiation absorbing metals, metal ores and the like. Thus, a mixture of particulate dried gelling polymer and insoluble radiation absorbing metal or oxide particles can be placed in a confining cavity for use as a shield and water is added to form the gel in place. Alternatively, the gel can be formed in a container remote from the shield-forming cavity and pumped into it.

The following description of monomers, crosslinking agents, additives to prevent freezing and catalysts applies to making either the continuous or particulate gels.

As used herein the term "water-soluble vinyl monomer" refers to any monomer containing vinyl unsaturation which is soluble in water at the concentration employed and which, if it were not for crosslinking, would form a polymer which is soluble in water at the concentration employed.

By such polymers is meant to include any crosslinked species of a polymer whose linear analog is water soluble. Typical of such materials are crosslinked polymers made from monovalent cation salts of acrylic and sulfoethyl acrylic acids. Other typical examples include crosslinked polyglycols having average molecular weights of from about 1,000 up to a million or more; crosslinked substantially water-insoluble, water-swellable sulfonated alkaryl and aromatic polymers, such as, for example, crosslinked polysodium styrene sulfonate and sulfonated polyvinyl toluene salts; copolymers of such sulfonated alkaryl and aromatic materials with acrylonitriles, alkyl acrylonitriles and acrylates; crosslinked polyvinyl alcohol and polyacrylamide and crosslinked copolymers of polyacrylamide as for example, the crosslinked copolymer of acrylamide and acrylic acid and of acrylamide and the monovalent salts of acrylic acid; crosslinked heterocyclic monomers, such as polyvinyl morpholinone, poly-5-methyl-N-vinyl 2-oxazolidinone and polyvinyl pyrrolidone; other crosslinked water-swellable but water-insoluble polymers or copolymers can also be employed.

Such materials as the above-named polymers can be made by a variety of known methods. For example, the substantially water-insoluble, water-swellable, crosslinked polyacrylate salts may be prepared by chemical crosslinking as shown in British Pat. No. 719,330 or, alternatively, by subjecting a mixture of a monovalent cation salt of acrylic acid and water to the influences of high energy ionizing radiation for a period of time sufficient to effect the desired polymerization and the crosslinking of at least a portion of the polymer produced. In the latter instance, the amount of ionizing radiation should be at least great enough to give a swellable polymer which takes in water or aqueous solutions and, in so doing, increases in volume but generally retains its original shape. With this class of polymeric materials, it is critical to the method of the present invention that the salt-forming cation be monovalent. Representative examples of monovalent cations include, for example, the alkali metals, that is, sodium, potassium, lithium, rubidium, and cesium, as well as water-soluble ammonium and ammonium-like radicals based upon the quaternary nitrogen atom.

Other methods for preparing such crosslinked materials may be found in U.S. Pat. No. 2,810,716, issued Oct. 22, 1957, to Markus. The acrylamide polymers and copolymers may be chemically crosslinked with alkylidene bis-acrylamides of the formula

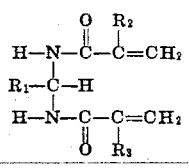

in which $R_1$ is a hydrogen atom or a lower alkyl group of from one to four carbon atoms such as a methyl, ethyl, n-propyl, i-propyl, n-butyl, i-butyl, tert.-butyl or sec.-butyl group. The preferred crosslinking agents are the methylene bis-acrylamide compounds, i.e., $R_1 = H$ in the above formula. Other suitable alkylidene bis-acrylamide crosslinking agents are described in U.S. Pat. No. 3,046,201 to White et al., and methods of preparing water-swellable polymers are disclosed in U.S. Pat. No. 3,247,171. The teachings of both of these patents are incorporated herein by reference. Other crosslinking agents which may be used include divinylbenzene, divinyl ether of diethylene glycol and diallyl sucrose. The preferred crosslinking agents are the water-soluble crosslinkers. Only a minor amount of crosslinking agent is used. For example, the amount of crosslinking agent may vary from about 300 to 3,000 parts per million (preferably from about 1,000 to 2,000 ppm) based upon the total weight of the polymeric material which is to be crosslinked.

The performance of the aqueous gel as a radiation shield depends on a number of conditions: (1) the type, energy and rate of radiation being shielded, (2) the polymer concentration and type of polymer, (3) the chemical change effected by radiation on the polymer, and (4) the type and concentration of the soluble or insoluble radiation absorbing materials employed.

The crosslinked polymers enumerated above are stable in the presence of dissolved salts and to continuous radiation over long periods of time, e.g., several years. Certain of the polymers, notably polymers containing methacrylic acid or its salts or substituted derivatives, e.g., sulfoethyl methacrylic acid and its salts, are subject to degradation as the primary effect of radiation, as opposed to crosslinking which is the effect of radiation on those polymers previously listed. The methacrylic acid-type polymers can be used if low radiation doses are to be shielded. Degradation will be delayed if radiation absorbing soluble salts or insoluble materials are used together with those polymers subject to degrading.

If radiation absorbing soluble salts or the insoluble particulate materials are employed with the gels which do not degrade, the effect is to delay the crosslinking. The effect of adding the particulate insoluble radiation absorbers to the particulate gels is two-fold. First, as above, it absorbs part of the radiation, preventing or delaying the crosslinking effect. Second, it takes up space, physically preventing the gel from shrinking which is what happens when polymer gels become more highly crosslinked. As the polymer gel containing the aqueous solution is additionally crosslinked, the gel network shrinks causing an exclusion of some of the water. This phenomnenon is known as syneresis. Syneresis is reduced or prevented by using higher amounts of polymer, on the order 10 percent or above. However, the use of the radiation absorbing material is preferred because of the added effect.

In preparing the radiation shield from the water-soluble vinyl monomer, it is admixed with water or, preferably, with a mixture of water and a water-soluble glycol. In general, an aqueous solution of the water-soluble vinyl monomer is employed which contains from about 2 to about 50 wt. percent, preferably from about 5 to about 1 weight percent, monomer based on the total weight of the gel. A water-soluble glycol may be employed to replace a substantial portion of the water and it is generally preferred to employ from about 10 to about 50 weight percent glycol based on the weight of the total gel. As much as 65–70 percent glycol may be used. The use of a glycol to replace a portion of the aqueous phase not only reduces the freezing point of the gel, but improves the clarity of the final gel. Ethylene glycol has been found to be particularly suitable.

The term water-soluble when used with regard to the crosslinking agent means that the particular crosslinking agent will form a clear solution in the polymerizable aqueous mixture at the concentration employed. The proportion of crosslinking agent to be employed is dependent on the crosslink density desired and on the monomer concentration employed. A more dilute vinyl monomer solution requires more crosslinker to achieve the same gel properties than does a more concentrated monomer solution. In general, however, from about 0.01 to about 10 weight percent, preferably from about 0.2 to about 2 percent crosslinker is employed, based on the vinyl monomer present. If too little crosslinker is employed, the gel is thin and soft and will tend to flow and will now provide support for any suspended insoluble radiation absorbing materials. Further, it will leak out of the container if the container develops cracks. If too much crosslinker is employed, the gel becomes brittle and loses cohesiveness or forms insoluble particles which precipitate from solution and cloud the gel. Therefore, sufficient crosslinker is employed to provide a gel of the desired consistency without becoming brittle and fragile or producing insoluble particles.

Polymerization of the above-described system is produced by employing a free radical producing catalyst. Since it is desirable in most instances that the polymerization take place at or near room temperature, or without the application of heat, it is therefore necessary that the catalyst or catalyst system employed be capable of producing sufficient free radicals to initiate polymerization at or near room temperature. Suitable free radical producing catalysts include ionizing radiation such as gamma rays, beta rays, or ultraviolet irradiation, redox catalyst systems such as the mixture of an alkali metal persulfate, and an alkali metal bisulfite activated with a soluble salt of a polyvalent metal such as $FeSO_4$. Substantially any of the known water-Soluble, free-radical producing redox catalyst systems may be employed in the process of this invention but the catalyst composed of $K_2S_2O_8$ and $Na_2S_2O_5$ activated with $FeSO_4$ has been found particularly effective. Still better results are achieved if the redox catalyst system is additionally activated with a hydroperoxide such as tertiary butyl hydroperoxide. This permits lower activation temperatures, more rapid polymerization and additionally removes any color contained within the gel due to the presence of materials such as iron salts.

When radiation is used to initiate the polymerization of the monomers, a dose of ionizing radiation of from about 0.001 to about 50 megarads is required. If it is desired to also crosslink by means of radiation, a total dose of from about 0.01 to about 50 megarads is required. The particular dose required is dependent upon the particular monomer or monomers being used, their concentration in solution, their being free of inhibitors, the dose rate used, and the type of radiation.

GENERAL DESCRIPTION OF THE PROCESS

In a general procedure for making the continuous gels the vinyl monomer and the divinyl crosslinking agent are added to the water or a water-glycol solution containing the radiation absorbing metal salt, e.g., $NaBO_2$, and an iron salt (activator). To this is added, simultaneously, aqueous solutions which comprise the free-radical catalyst system, e.g., solutions of $K_2S_2O_8$, $Na_2S_2O_5$ and tert-butylhydroperoxide. These solutions are thoroughly mixed and the polymerization proceeds rapidly. The rate of reaction is dependent upon the amount and type of catalyst, the amounts and types of divinyl crosslinker and monomer present and the temperature, which parameters are known to the art-skilled. It also depends to some extent on the concentration of the radiation absorbing salt.

An alternative method for gelling the water or water-glycol solution is to add finely divided water swellable crosslinked polymers to the aqueous solution. This is done with gentle stirring to keep formation of air bubbles between the gel particles to a minimum. The aqueous solution may contain a radiation absorbing salt as above.

The following examples are representative of the invention.

EXAMPLE 1

A solution of 1,180 g. of ethylene glycol, 1,180 g. acrylamide and 9,440 ml. deionized water were mixed and filtered twice. To this solution was added 118 ml. of 0.1% $FeSO_4·7H_2O$ aqueous solution, and 944 ml. 2.0% N,N'-methylene bisacrylamide (MBA) aqueous solution. The solutions were mixed thoroughly and poured into a plastic box 24 × 24 × 2 inches. In order to prevent the exotherm from becoming too great, the above quantity was divided into four equal volumes and polymerized one after the other. Thus, each succeeding polymerization was carried out on top of the previously polymerized portion and each layer was integrally associated with the adjacent layer, forming one large gelled mass of aqueous solution.

For each 2,800 ml. of the above solution, 118 ml. each of 1 percent aqueous solutions of $K_2S_2O_8$ and $Na_2S_2O_5$ and 29.5 ml. of a 1 percent aqueous solution of tert-butyl hydroperoxide (TBHP) were used. These three solutions were added simultaneously to the solution containing monomer and crosslinker.

The solutions were thoroughly mixed and polymerization proceeded rapidly with evolution of considerable heat. The top of the box was covered with a stainless steel cover which lapped over and down the sides. A silicone rubber was used to seal the top of the box to prevent evaporation of the gelled water.

While a plastic box, or wall segment, can be used, the more usual practice is to use a glass-walled section with metal channels joining the edges of the glass plates. The following example is illustrative:

EXAMPLE 2

Using ¼ inch plate glass, a window, or wall segment, was constructed using three panels of glass, each 24 × 24 inch, which were set parallel to one another in aluminum channels on three of their edges, leaving one side open. This provided a two compartment box with two side panels and a parallel central panel of glass and three sides of aluminum channel. The glass edges were sealed into the aluminum channel using silicone rubber. Each compartment had a volume of about 6.35 liters. This box was filled with gelled water in the same manner as Example 1 above.

EXAMPLE 3

In order to demonstrate that the polymerization can be accomplished in an aqueous solution containing dissolved salts, especially those capable of absorbing radiation, the following experiment was conducted.

A monomer system was prepared as follows: 100 g. of dry acrylamide and 100 g. ethylene glycol were dissolved in 800 ml deionized $H_2O$ and filtered twice. Solutions were prepared containing 2% N,N'-methylene bisacrylmide (MBA), 1% $K_2S_2O_8$, 1% $Na_2S_2O_5$ and 1 percent t-butyl hydroperoxide, each dissolved in a mixture of 10 percent ethylene glycol and 90 percent deionized water. Another solution was prepared of 0.1% $FeSO_4$ in water.

A control and a sample containing 2.50 g. borax ($Na_2B_4O_7·10 H_2O$) dissolved in 50 ml. monomer were polymerized separately according to the following procedure.

50 ml of monomer (acrylamide) solution
4.0 ml 2% MBA solution
0.5 ml .1% $FeSO_4·7 H_2O$ solution 2.0 ml $K_2S_2O_8$ solution
2.0 ml $Na_2S_2O_5$ solution
0.5 ml TBHP solution The control began polymerizing slowly after about 2½ minutes and soon set to a clear rigid gel.

The mixture containing the borax started polymerizing after 3 or 4 minutes. It proceeded slowly and as the polymerization progressed the solution, which had been hazy, cleared. After about 30 minutes it had cooled back to room temperature and a very tough resilient gel which had a very light amber color resulted. The clarity was good, with no bubbles or striations. The gel appeared "tougher" than the control.

EXAMPLE 4

A transparent solution having a grayish cast was prepared by dissolving 80 g. of $ZnBr_2$ in 20 g. of water. The density of this solution was 2.5 g./cc; 45 g. of this solution was used to dissolve 5 g. of crystalline acrylamide.

This monomer solution was irradiated with gamma rays from a $Co^{60}$ source for one hour at a dose rate of 0.08 megarads per hour. The result was a firm transparent gel.

EXAMPLE 5

Example 4 was repeated using 5 percent by weight acrylamide dissolved in a 70% $ZnCl_2$ — 30 percent water solution. The resultant transparent firm gel had a density of 2.0 g. per cc.

EXAMPLE 6

The following solutions were prepared:
1. 22 g. of acrylamide was dissolved in 100 g. of a solution of 70% $ZnCl_2$ — 30% $H_2O$.
2. 0.2 g. of N,N'-methylene bisacrylamide was dissolved in 50 g. of solution of 70% $ZnCl_2$ — 30% $H_2O$.
3. 0.1 g. of sodium metabisulfite was dissolved in 25 g. of 70% $ZnCl_2$ — 30 percent water solution.
4. 0.1 g. of potassium persulfate dissolved in 2 g. of water and then mixed into 25 g. of a 70% $ZnCl_2$ — 30 percent water solution.

Solutions 1 and 2 were mixed and evacuated to remove the dissolved air. Then solution 3 was mixed in followed by solution 4. After solution 4 was added, the mix set into a gel within 9 seconds. The gel was very warm due to the exotherm during the polymerization. The resultant product was a transparent firm gel.

EXAMPLE 7

Example 6 was repeated using 320 g. of 70% $ZnCl_2$ — 30 percent water solution instead of 100 g. in solution (1). This mixture set into a firm transparent gel in about 45 seconds. It was felt this mixture was the easiest to handle and had the best optical clarity.

EXAMPLE 8

The container of gelled water prepared in Example 1 above was placed in a radiation chamber and exposed to gamma radiation. The total dose at the end of the experiment was $5.7 \times 10^7$ rads and the polymer had not changed in physical properties with the exception of a very slight yellow discoloration. The gel was also slightly more susceptible to being broken up with a rod than was the same non-irradiated gel.

EXAMPLE 9

A test to see the effects of freezing and thawing on a small sample gel formulation was made. This sample was prepared previously in a 4 inch diameter styrene box. This was prepared from 213 ml of monomer (10 percent acrylamide — 10% ethylene glycol in $H_2O$ — 200ml, 8.0 ml 2% MBS soln., 2.0 ml of 0.1% $FeSO_4 \cdot 7H_2O$ soln. and 3.0 ml formaldehyde).

This was polymerized by adding simultaneously 8.0 ml of 1% $K_2S_2O_8$, 8.0 ml of 1% $Na_2S_2O_5$ and 2.0 ml. of 1% TBHP.

About 220.5 g. of gel was tested. A clear polystyrene cover was placed over the gel (about ¾ inch void present) and was sealed on with plastic tape. The sample was placed (cover up) in the deep freeze at $-20°C$ for 4 hours.

After 4 hours the gel was frozen solid and an opaque white in color. It thawed very slowly at room temperature and droplets of $H_2O$ formed on the cover (still upright). While still partially frozen approximately 5 or 6 ml of water as free liquid was observed to be present on the surface of the gel and the plastic. When completely thawed and at room temp. there was essentially no free liquid. The cover was removed and the container weighed the same 252 grams. The gel was clear with slight "marbeling" at the upper surface. The optics were still good.

The cover was sealed back on and it was placed in the deep freeze for an extended test. It was removed from the freezer after 16 hours. Again the gel was frozen solid and opaque. This time however, a ridge of frozen gel was noticed on the surface and ice crystals were very noticeable in the gel. The sample was allowed to warm slowly. Again free liquid was noted. This time the container was opened and this liquid removed. The gel had lost 8.0 g. of water at this point. Also the resulting gel was very marbled with small tears and voids internally. It also pulled away from the container walls at the top. The optics were poorer, but seemed to improve with time. The gel was noticeably clearer 20 hours after thawing than immediately after thawing. The sample was observed for several more days. No additional free liquid was noted.

EXAMPLE 10

Preparation of Monomer:
22.7 kg dry grade acrylamide was dissolved in 181.6 kg deionized $H_2O$ and 22.7 kg low conductivity grade ethylene glycol along with 370 g. N,N'-methylene bisacrylamide and 4.0 g. $FeSO_4 \cdot 7H_2O$. When dissolved and mixed this was pumped consecutively through a 100 micron and a 10 micron filter into a vacuum tank. The solution was evacuated to a pressure of about 20 mm Hg and maintained at that pressure for 3½ hours. The vacuum was released and 190.7 kg of the monomer solution was pumped into a 55-gallon drum. A quantity of 2.27 kg of 37 percent aqueous formaldehyde was added to the 55-gallon drum of monomer just before using.

Preparation of Catalysts:
Catalysts were prepared as follows:
64 g. $K_2S_2O_8$ dissolved in 6340 ml deionized $H_2O$ (1 percent)
64 g. $Na_2S_2O_5$ dissolved in 6,340 ml deionized $H_2O$ (1 percent)

The container to be filled was a double walled stainless steel glove box. The walls were spaced 2 inches apart. The box was of complex design with two large holes for viewing windows. It had four ports for gloves, one access door and a round filter housing. The interior was washed several times with water and the volume determined to be approximately 265 liters.

A demand mixing device was set up and flows set for 18.95 l./min. /min. of monomer and 758 ml/min. of each catalyst (25:1 monomer to each catalyst). The tank was filled from the bottom of one end with the opposite end elevated. The first shot lasted approximately 11½ minutes with flows dropping slightly. By use of small holes it was determined that the baffled interior was adequately filled. The remaining volume on the top was filled the next day using freshly prepared batches of monomer and catalysts of the same concentrations as above. The shot was made from the top this time at the lower end and run over at the elevated end. When the gel was set, polyethylene and stainless steel plugs were used to seal the vents. The small door was filled at this time also.

Water soluble salts capable of absorbing various kinds of radiation can be employed. When water or hydrocarbons are used as shielding for neutrons, secondary radiation particles are emitted. These require additional shielding such as is provided by the addition of the zinc and boron salts indicated and exemplified above.

Other salts which are useful to shield against gamma radiation are the salts of heavy metals, e.g., Cd, W, Pb and the like, or any salts which increase the density of the medium. Salts for absorbing other radioactive emissions are known to those skilled in the art.

The soluble salts may be provided at various concentrations depending upon the requirements of the system, the solubility of the salt and other factors. Generally from about 0.5 percent to as much as 85 percent by weight of the salt based on the total weight of solution is employed.

It is desirable to include compounds which act to inhibit fungi and bacterial growth. Formaldehyde, as shown in Example 9 above, is satisfactory for this purpose. Other compounds useful for this purpose are the 1,3-dichloropropene salt of hexamethylenetetramine, calcium propionate, acetaldehyde and the like. Others known to the art can be used providing they are compatible with the system. The inhibitor compounds are unnecessary when the system is completely sterile either because of its preparation or because of the type and intensity of radiation being used. Sometimes the salts used for absorbing radiation are also inhibitors for fungi and bacteria. The inhibitors may be added to the in situ polymerization components or the aqueous solution used in gelling the particulate polymer.

The following Examples show particulate and continuous gels containing insoluble radiation absorbing material and the results of tests which show them to be effective to employ as radiation shielding.

EXAMPLE 11

Identical solutions were prepared as in Example 10 above and continuous gels formed as above. The gels without additives weighed 30 g. and were formed in 2 oz. soft glass bottles and different insoluble radiation absorbing materials were stirred into the solutions during formation of the gel. The gel began forming in about 35 seconds and the insoluble materials were suspended uniformly throughout the gel. The bottles were capped and exposed to ionizing radiation from a 0.065 mg Ra–226 source to determine the absorbing ability of the insoluble materials suspended therein. The radiation source was placed on one side of the bottle and a detector on the other side. Results which indicate the radiation absorbing ability of the various gels and suspended materials as compared to controls are shown in Table I.

TABLE I

| Sample No. | Type of Additive | Wt. of Additive (g) | Reading in mr/hr.* |
|---|---|---|---|
| 1 | air path | | 1.3 |
| 2 | empty bottle | | 1.05 |
| 3 | gel + bottle | | 0.90 |
| 4 | CdO | 30 | 0.80 |
| 5 | CdO | 50 | 0.70 |
| 6 | PbO | 30 | 0.70 |
| 7 | PbO | 50 | 0.55 |
| 8 | Boron | 2.5 | 0.90 |
| 9 | BiO$_3$ | 30 | 0.70 |
| 10 | Zn (pwdrd) | 30 | 0.70 |
| 11 | BaSO$_4$ | 30 | 0.78 |
| 12 | Boric acid | 15 | 0.87 |
| 13 | Li acetate | 15 | 0.78 |

* milliroentgens/hour

EXAMPLE 12

Particulate gels were prepared by adding various amounts of a finely divided copolymer of 70 percent acrylamide, 30 percent sodium acrylate with approx. 0.1 percent N,N'-methylenebisacrylamide. Some of the samples had formaldehyde added to the solution. Table II lists amounts of polymer, formaldehyde, and water used in preparing the gels.

TABLE II

| Sample No. | Formaldehyde (g) | Water (g) | Polymer (g) | Polymer (%) |
|---|---|---|---|---|
| 1 | 24 | 775.2 | 0.8 | 0.1 |
| 2 | 48 | 1544 | 8.0 | 0.5 |
| 3 | 24 | 768 | 8.0 | 1.0 |
| 4 | 24 | 736 | 40.0 | 5.0 |
| 5 | 24 | 752 | 24.0 | 3.0 |
| 6 | 0 | 792 | 8.0 | 1.0 |
| 7 | 0 | 760 | 40.0 | 5.0 |
| 8 | 0 | 796 | 4.0 | 0.5 |
| 9 | 0 | 776 | 24.0 | 3.0 |

EXAMPLE 13

Table III gives the results of the radiation absorption tests conducted in the manner described in Example 11 above. The numbers of the gels used refer to the gels in Table II above, which were used together with the various absorbing materials shown. The weight of the gel alone was 30 g. in all samples except No. 10, which weighed 31 g.

Metals which can be used in addition to the zinc and lead exemplified in Table III are tin, cadmium and bismuth. Other dense metals may be used depending upon availability and cost, as may other water insoluble compounds in addition to those shown in Tables I and III.

TABLE III

| Sample No. | Gel Used | Additive (Type) | (g) | Meter Reading mr/hour |
|---|---|---|---|---|
| 1 | No. 4 | control | | 0.9 |
| 2 | 4 | Sand | 30 | 0.75 |
| 3 | 4 | Sand | 50 | 0.64 |
| 4 | 4 | Sand | 70 | 0.60 |
| 5 | 4 | Pb | 120 | 0.5 |
| 6 | 3 | Pb | 172 | 0.33 |

| | | | | |
|---|---|---|---|---|
| 7 | 3 | Zn | 30 | 0.8 |
| 8 | 5 | CdO | 30 | 0.73 |
| 9 | 5 | BiO₃ | 31.0 | 0.7 |
| 10 | 3 | H₃BO₃ | 16.0 | 0.73 |
| 11 | 3 | PbO | 30.0 | 0.65 |
| 12 | 3 | BaSO₄ | 30.0 | 0.76 |
| 13 | 3 | Pb | 30.0 | 0.7 |
| 14 | 3 | Pb | 71.0 | 0.57 |
| 15 | 3 | Pb | 120.0 | 0.45 |

EXAMPLE 14

The samples of gel without any additives which were made in Example 12 above were exposed to gamma radiation from a Co–60 source. The dose rate was about 0.08 Mrads per hour. The 0.1 percent aqueous gel failed after 3 hours, i.e., it had degraded to the point of not having the form of a rigid gel but was a thin solution containing some particles of gel. The 0.5 percent aqueous gel began to degrade after 8 hours of exposure to the radiation. Concentrations between 0.1 percent and 0.5 percent degraded at times intermediate of 3 and 8 hours. Concentrations of about 5 percent are preferred as those which are satisfactorily resistant to radiation.

We claim:

1. A radiation shield comprising a wall segment having a hollow section which is filled with water as the principal radiation absorber wherein said water contains a crosslinked polymer of a water soluble vinyl monomer in sufficient amount to gel, and immoblize said water, and an insoluble particulate radiation absorbing material uniformly dispersed therethrough.

2. The article of claim 1 wherein the crosslinked polymer is polyacrylamide crosslinked with N,N'-methylenebisacrylamide.

3. The article of claim 1 wherein the insoluble particulate material is an oxide of lead, cadmium or bismuth.

4. The article of claim 1 wherein the insoluble particulate material is a radiation absorbing metal selected from the group consisting of zinc, lead, tin, bismuth and cadmium.

5. The article of claim 1 wherein the insoluble particulate material is an insoluble salt of a heavy metal.

6. The article of claim 1 wherein the insoluble particulate material is sand.

7. A process for making a radiation shield which comprises (1) providing a confining vessel (2) mixing in said vessel (a) an aqueous solution of a polymerizable water soluble monomer containing an activator and a crosslinking divinyl monomer and (b) an aqueous solution of a free radical producing catalyst to polymerize said monomer to form in situ a gelled aqueous solution and (3) uniformly dispersing therein an insoluble particulate radiation absorbing material during the polymerization.

8. A process for making a radiation shield which comprises (1) providing a confining vessel containing an aqueous solution of water soluble monomer polymerizable to a crosslinked polymer, (2) irradiating said monomer solution with a dose of ionizing radiation sufficient to polymerize and crosslink said monomer to form a continuous gelled aqueous solution in said vessel in the presence of a uniformly dispersed insoluble particulate radiation absorbing material.

* * * * *